Aug. 30, 1932.     W. M. WOOD     1,874,405
VALVE SEAT
Filed March 14, 1930

INVENTOR
WILLIAM. M. WOOD
BY Fetherstonhaugh & Co
ATTORNEYS

Patented Aug. 30, 1932

1,874,405

UNITED STATES PATENT OFFICE

WILLIAM M. WOOD, OF SAINT JOHN, NEW BRUNSWICK, CANADA

VALVE SEAT

Application filed March 14, 1930. Serial No. 435,875.

This invention relates to valves and has particular reference to valves of the sliding disc or gate type.

The purpose of the invention is to provide a valve construction in which the valve faces are maintained in fluid tight contact with their respective seats when the valve is pressed to closed position and without subjecting the valve to excessive pressure or strains.

Various mechanical means have been heretofore employed for applying sufficient pressure to maintain the valve faces in fluid tight engagement with their respective seats but such expedients have not proven wholly satisfactory. The engaging valve and seat faces, being of rigid non-yielding construction, must be very accurately manufactured to ensure fluid tight contact. If there is the least inaccuracy in the maufacture of these engaging faces the excessive pressure which must be applied to tightly close the valve sets up undesirable strains in various parts of the valve structure. Even when the valve and seat faces are accurately manufactured and fit perfectly when at a normal temperature, the uneven expansion of the various parts at higher temperatures, causes excessive strains which ultimately result in a leaking valve. Then, too, a certain lack of uniformity in the pressure of the valve faces against the engaging seat surfaces results in excessive friction on certain portions of said seat surfaces, with the result that these surface portions wear rapidly and render maintenence of the valve difficult and expensive.

In order to eliminate the above mentioned faults in the construction of gate and disc valves now on the market I propose, in accordance with the present invention, to provide a new type of seat ring. This new type of seat ring, (as distinguished from the usual rigid, flat face seat ring now in use,) is made with a sloping valve engaging face inclining upwardly from the outer to the inner circumference of the ring so that the engaging flat face of the gate or disc valve will first bear on the inner edge of the sloping seat ring face when the valve is pressed to its closed position. The higher or inner edge portion of the sloping seat ring face is undercut so as to be slightly flexible when pressure is applied thereto. When the valve is forced between two of these seat rings, arranged in the usual manner, the inclined flat faces of the valve first come in contact with the inner edges of the sloping seat ring faces which are thereby compressed or spring back to conform to the exact shape of the engaging valve faces. The resilient pressure exerted by the undercut portions of the seat ring faces against the engaging valve faces ensures fluid tight contact and also enables expansion and contraction to take place without setting up undesirable strains.

Proceeding now to a more detailed discussion of the invention, reference will be had to the accompanying drawing.

Figure 3:
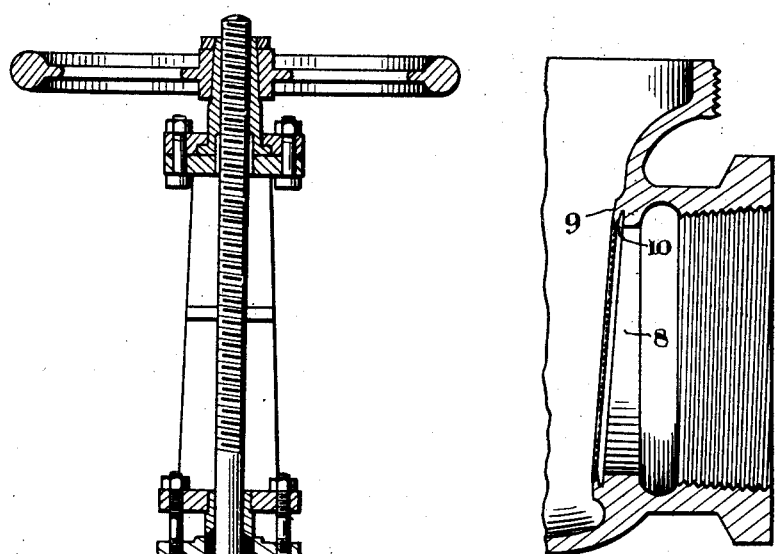
Figure 3 is a fragmentary vertical sectional view through a portion of a valve casing having my improved seat ring formed integral therewith.

In this drawing, I have shown by invention applied to a gate valve of standard construction including a valve casing 5, a wedge gate valve 6, and a threaded valve operating spindle 7. The valve seat rings 8 constituting the present invention, are formed with sloping valve seating faces 9. These faces 9 are inclined upwardly from the outer to the inner edges of the seat rings. At its inner circumference, each ring 8 is undercut as indicated at 10 so that the inner or higher edge portion of each of the valve seating faces 9 is capable of a limited amount of flexion when subjected to the pressure of the engaging valve faces.

Figure 1:
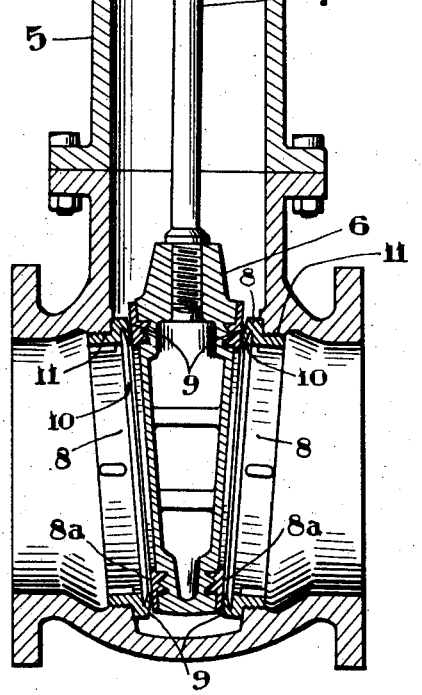
Figure 1 is a vertical sectional view through a gate valve of standard construction equipped with my improved seat rings.

The seat rings 8 are angularly disposed as shown in Figure 1, so that there is an intervening tapering space conforming to the wedge like contour of the gate valve 6. When the gate valve is forced between the seat rings 8, during closing of the valve, the sloping flat faces 8a of the valve first come into contact with the flexible inner edges of the valve seating faces 9. The pressure thus applied by the valve causes the flexible inner edges of the faces 9 to spring back sufficiently to conform to the exact shape of the engaging valve faces. The pressure imposed on the faces 9 of the seat rings through the medium of the spindle 7 and the wedging action of the valve 6 is much greater than the fluid pressure to which the valve is subjected when in closed position, with the result that the contacting surfaces of the valve and seat rings will remain in fluid tight engagement. The degree of flexibility afforded by undercutting the inner edges of the valve seating faces 9 is sufficient to eliminate the objectional strains incident to uneven expansion and contraction of the parts. It may also be pointed out that when the valve 6 is being moved to and from closed position, the flexible inner edge portions of the surfaces 9 tend to hold the valve away from the remaining portions of said surfaces so that most of the wear takes place on the more easily repaired or renewed valve surfaces 8a, rather than on the engaging surfaces of the rings 8. The flexibility of the seat rings 8 also enables said rings to be interchangeably assembled with different valves without requiring any particular fitting or machining of the engaging faces of the valves and rings.

Figure 2:
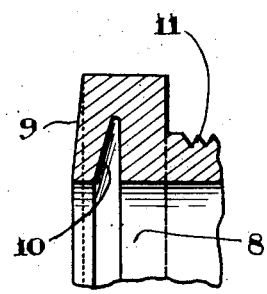
Figure 2 is an enlarged fragmentary detailed view of a portion of one of the seat rings shown in Figure 1.

In Figures 1 and 2 I have shown the valve rings 8 as provided with collars 11 threadedly engaging the valve casing 5, but it will be understood that the seat rings may be formed integral with the valve casing as shown to advantage in Figure 3.

Having thus described what I now consider to be the preferred embodiments of my invention, it will be understood that various modifications may be resorted to within the scope and spirit of the appended claims.

Having thus described my invention, what I claim is:—

1. A valve structure comprising a valve member and an annular seat member across which the valve member is movable during opening and closing of the valve, one of said members being formed with a sloping surface engageable with the other member and arranged so that the higher edge of said surface is initially engaged by the other member during closing of the valve, said sloping surface being undercut and yielding at the said higher edge, but solid and unyielding at the lower edge.

2. A valve structure including a wedge shaped gate valve and a valve body presenting an annular valve seat surface surrounding one of the flow openings across which the gate valve is movable, said surface sloping upwardly from the outer to the inner circumference thereof and being continuously undercut at the inner circumference to a radial depth substantially less than the width of said surface as measured between its inner and outer circumference, the non-undercut portion of said surface constituting a rigid seat for the valve and the undercut portion of said surface serving as a flexible sealing ring.

3. A gate valve including a valve body presenting an annular valve seat surface sloping upwardly from the outer to the inner circumference thereof, said seat surface being yieldable at the higher edge and nonyieldable at the lower edge.

In witness whereof I have hereunto set my hand.

WILLIAM M. WOOD.